United States Patent [19]
Karlyn et al.

[11] Patent Number: 5,429,045
[45] Date of Patent: Jul. 4, 1995

[54] MEANS FOR REGISTERING A COMPACT DISC FOR THE SILK-SCREEN PRINTING THEREOF

[76] Inventors: William M. Karlyn, 602 Chestnut St., Lynnfield, Mass. 01940; Edward J. Berry, 157 Newton St., Revere, Mass. 02151; William M. Lamarre, 119 Water St., Unit 63, Beverly, Mass. 01915

[21] Appl. No.: 179,387

[22] Filed: Jan. 10, 1994

Related U.S. Application Data

[63] Continuation-in-part of Ser. No. 974,618, Nov. 12, 1992, abandoned.

[51] Int. Cl.6 .............................. B41F 15/26
[52] U.S. Cl. .................... 101/35; 101/41; 101/126; 101/485; 101/DIG. 36
[58] Field of Search ............. 101/35, 41–44, 101/115, 126, 129, 474, 481, 485, 486, DIG. 36; 33/613, 614, 617, 620, 621, 623, 644, 645

[56] References Cited

U.S. PATENT DOCUMENTS

| | | | |
|---|---|---|---|
| 1,543,991 | 6/1925 | Pamphilis | 33/614 |
| 2,438,639 | 3/1948 | Lawrence | 101/407.1 |
| 3,240,150 | 3/1966 | Doppelt | 101/474 |
| 4,463,673 | 8/1984 | Moore | 101/126 |
| 5,138,772 | 8/1992 | Barnes | 33/613 |
| 5,165,340 | 11/1992 | Karlyn et al. | 101/35 |

FOREIGN PATENT DOCUMENTS

| | | | |
|---|---|---|---|
| 2645166 | 4/1978 | Germany | 101/DIG. 36 |
| 306040 | 12/1988 | Japan | 101/DIG. 36 |

Primary Examiner—Edgar S. Burr
Assistant Examiner—Stephen R. Funk
Attorney, Agent, or Firm—Herbert L. Gatewood

[57] ABSTRACT

Registration of compact discs for the silk-screen printing thereof is accomplished by a single registration pin located below the transport member at the loading point for a disc. The registration pin is raised upwardly and intrudes into the center hole of the disc as the disc is placed into the disc fixture. The registration pin is retracted with application of vacuum.

26 Claims, 4 Drawing Sheets

MEANS FOR REGISTERING A COMPACT DISC FOR THE SILK-SCREEN PRINTING THEREOF

CROSS-REFERENCE TO RELATED APPLICATION

This application is a continuation-in-part of U.S. application Ser. No. 07/974,618, filed Nov. 12, 1992, now abandoned.

BACKGROUND OF THE INVENTION

1. Field of the Invention

This invention relates, in general, to means for, and process of, registering relatively small, flat objects each having a defined opening whereby the objects can each be registered or centered for further handling. In particular, the invention relates to registration means having utility in combination with apparatus for the decorative printing of such objects. Even more particularly, the invention is concerned with registration means having utility in silk-screen and offset printing machines for application of decorative or informational matter to discs having a centrally disposed opening such as compact discs.

2. Description of the Prior Art

The registration of various work pieces prior to the performance of work thereon is commonly done. Thus, for example, in the decorative silk-screen printing of various substrates such as flats and plastic bottles these members must first be registered or oriented relative to the printing head so that the printing ink is applied to the substrate at the desired location. Otherwise, as will be readily appreciated, the informational or aesthetic value of such printing may be lessened and, in some cases, even necessitate discarding the object to waste. This, of course, is highly undesirable as such wastage results in increased costs of operation. The potential for such a problem happening is particularly great where more than one color of ink is to be applied to the substrate surface.

One method for the screen printing of compact discs involves, in general, the transporting of the discs on a rotatable annular-shaped member in a spaced-apart fashion in a horizontally disposed circular-defined path. The compact discs are each transported, in turn, to a plurality of printing locations whereat such are silk-screen printed at each location with a pattern of ink of desired color. The ink pattern is cured or dried in conventional manner, e.g., by ultra-violet curing means, between each application.

In order to ensure that a compact disc is properly located or registered on the transport member and in proper relationship to the printing head for the screen printing operation, each disc is registered on the transport member. This is accomplished before a disc is silk-screen printed with the first color of the pattern to be applied. The precise registration of a compact disc for screen printing is extremely important, as such printing may cover substantially the entire surface of one side of a disc and, moreover, may involve the application of as many as six (6) different colors of ink. Such a decoration may include not just textual material but pictorial illustrations as well.

One compact disc printing system known heretofore to those in the screen printing art involves the registration of each compact disc following loading of the disc onto the transport member or device. Thus, in this system, a registration means comprising a registration pin located vertically above the transport member causes the registration or centering pin, in general, to be lowered whereby the free end thereof can intrude into the center opening of the compact disc from the top side or surface thereof. This pin intrusion causes the compact disc to move somewhat, even though a relatively small distance, to become centered or registered, as desired. Thus, the bottom side or surface of the compact disc, as loaded onto the transport member, moves across and in contact with the surface of the disc fixture in which the compact disc is located on the transport member. This movement, though small, is somewhat undesirable, however, as the surface of the compact disc in contact with the disc fixture, in this case the bottom surface, is the surface through which the recorded music or other information on the disc is read in a disc player. The result of such movement is occasional marring or scratching of the read-through surface. At the least, the disc may be cosmetically damaged. More importantly, however, there may also be damage to the fidelity of the disc. In such a case, the compact disc is necessarily discarded to waste. Registration by the centering pin piercing the centerhole from above can also damage the centering hole of the disc, again affecting its overall quality. This can occur even without damage to the disc cosmetically, or to its fidelity.

Another, somewhat more suitable and improved means of registering a compact disc prior to its being silk screen printed is disclosed in U.S. Pat. No. 5,165,340, which issued to William M. Karlyn et al on Nov. 24, 1992. The registration or registering means for a compact disc, as disclosed in that patent, is provided, quite advantageously, on the underneath side of the transport member. A registering means, moreover, is provided in opposition to each disc fixture located on the transport member. With such an arrangement, the compact disc is registered, i.e., centered, as it is being located in the disc fixture, not afterwards. Thus, as a compact disc is being placed into the disc fixture, the elongated registration pin of the registration means is caused to be raised vertically upwardly so as to intrude into the disc centerhole. The registration pin being located at the centerpoint of the fixture, the compact disc is, accordingly, centered in the desired location in the fixture whereby the surface to be printed is precisely registered or oriented to receive subsequent applications of printing ink. After the compact disc is registered, in fact almost simultaneously, the elongated registration pin is caused to be withdrawn from the disc's centerhole and vacuum is applied to the bottom surface of the disc. Thus, the compact disc is held and maintained in its registered location and orientation until after having been subjected to work, e.g. multiple printing applications. Then, the vacuum is released so that the printed compact disc can be off-loaded from the transport member.

Although quite satisfactory results have been obtained in the silk-screen printing of compact discs with the registration means disclosed in U.S. Pat. No. 5,165,340, the use thereof is attendant with certain disadvantages. As a registration means is provided for each disc fixture, this increases the overall cost of a screen printing machine. Perhaps, more importantly, however, it also provides for a greater number of possibilities where misregistration of a compact disc on the transport member might occur. These possibilities occur, primarily, due to tolerance variations during manufacture of the multiple number of registration means and the assembly of such a registration means in combination with each disc fixture and the transport member.

SUMMARY OF THE INVENTION

The present invention has as one object the providing of registration means for the registration of a compact disc on a transport member prior to the silk-screen printing thereof with informational text or decorative illustrations not attendant with the disadvantages or problems now found with disc registration means provided on screen printing machines.

A further object of this invention is to provide a transport member for a silk-screen printing machine with a single registration means for registering each of a plurality of compact discs to be silk-screen printed.

Another object of the present invention is to provide registration means for the registration and centering of a compact disc in a disc fixture prior to the silk-screen printing thereof.

Still another object of the invention is to provide registration means whereby, as the disc is being loaded into the disc fixture, it is centered requiring no further movement following loading to cause the disc to be registered for printing.

A still further object of the invention disclosed herein is to provide a single registration means that operates to register each of a plurality of compact discs for the later silk-screen printing on a surface of each thereof, as each of the discs is being loaded into a disc fixture therefor provided on a transport member.

Still another object of the invention is to provide a process of registration offering improved load accuracy over, and elimination of marring of a compact disc caused by registration means whereby centering of the disc is accomplished after such is loaded onto the disc fixture.

An even further object of the invention is to provide registration means comprising an elongated registration pin capable of being raised vertically upwardly to cause a compact disc to be registered and then withdrawn vertically downwardly.

Another object of this invention is to provide a single registration means for a compact disc which is located on the underside of the transport member for a plurality of compact discs comprising a retractable centering pin which intrudes into the disc centerhole from the bottom surface of the disc.

Still another object of the invention is to provide registration means for compact discs whereby the registration pin is releasably secured to a supporting member and can be dislodged therefrom by a predetermined shearing force horizontally disposed to the pin's vertical disposition, to avoid damage to the pin or to the printing apparatus.

Still an even further object of the invention is to provide registration means whereby, if the registration pin is sheared off from its supporting member, the registration pin can be readily recovered.

Quite advantageously, the providing of a single registration means rather than one for each disc or tooling fixture better ensures identical registration for each of a multiplicity of compact discs loaded one-after-another onto a transport member therefor.

Also, the invention disclosed advantageously reduces manufacturing costs and eliminates the need to manufacture multiple registration means for a single transport member and to assemble such to difficult tolerances.

Advantageously, the more preferred registration means comprises a shearable registration pin whereby damage to the registration means can be avoided, in the case of faulty operation thereof, e.g., whereby the registration pin might not, for one reason, be retracted soon enough or sufficiently, to avoid being caught by the transport member as it rotates. Quite advantageously also, such a sheared registration pin as provided by this invention can be re-assembled with the registration means and used again.

A further advantage with the registration means of this invention is that the operating means therefor causing a vertical up and downward movement of the registration pin includes a collapsible linkage thereby providing a further safety factor against damage to the registration pin or other parts of the registration means or to the rotatable transport member associated therewith.

BRIEF DESCRIPTION OF THE DRAWINGS

For a better understanding of the present invention, reference should be had to the following detailed description of the preferred embodiments of the invention which is to be read in conjunction with the accompanying drawings, in which.

DETAILED DESCRIPTION OF THE INVENTION AND THE PREFERRED EMBODIMENTS THEREOF

Although the present invention will be described hereinafter with particular reference to the accompanying drawings, it is to be understood at the outset that it is contemplated that the invention may be varied in specific detail from that illustrated and described herein while still achieving the desirable characteristics and features of the invention. Accordingly, the description which follows is intended to be understood as a broad enabling disclosure directed to persons skilled in the applicable arts, and is not to be understood as being restrictive.

Figure 1:
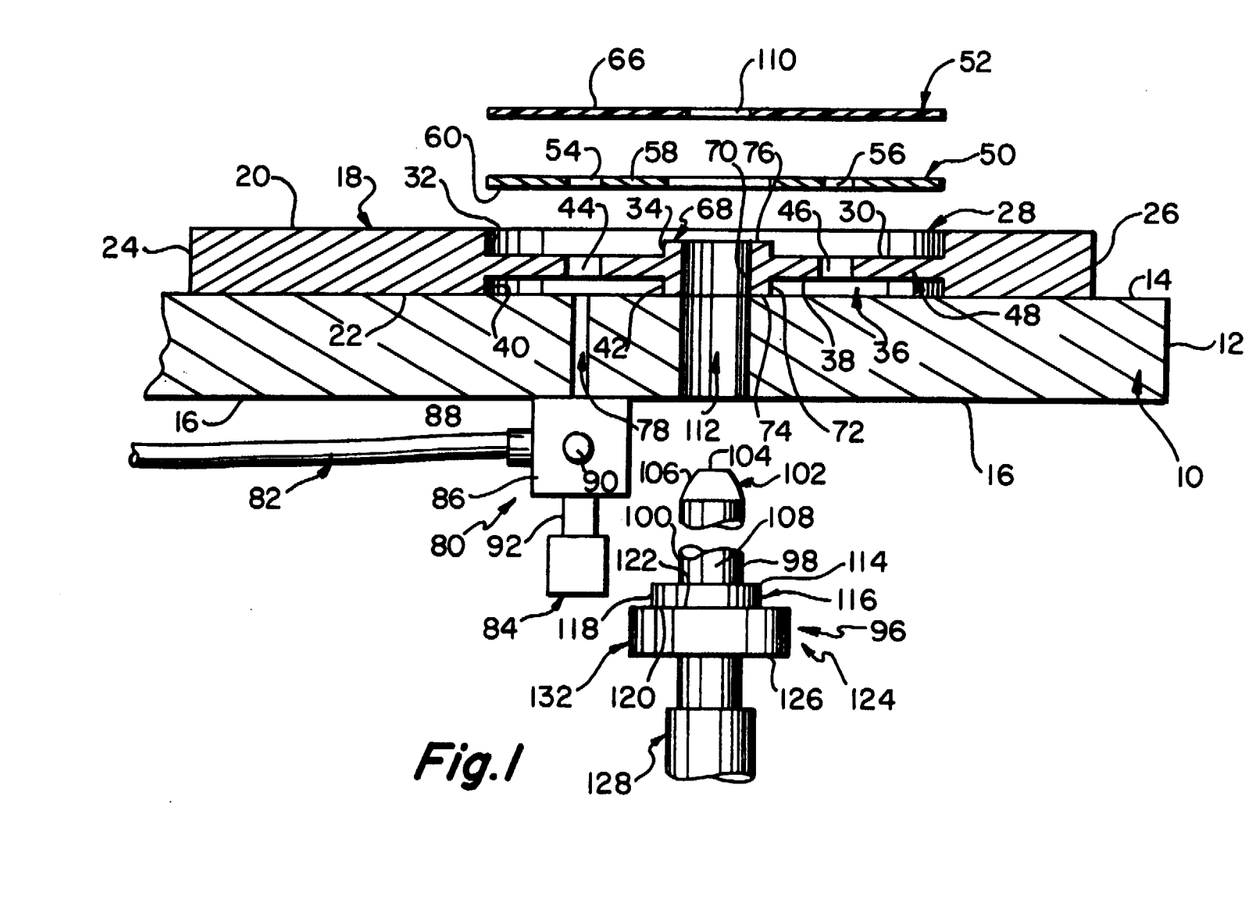
FIG. 1 is an exploded cross-sectional view of a disc fixture located on an annular-shaped rotatable transport member into which a compact disc is loaded and showing diagrammatically in combination therewith a partial view of a registration means according to one aspect of the invention.

Referring now to FIG. 1 of the drawing, there is shown therein a cross-sectional view showing, in part, an annular-shaped, rotatable, transport member 10, in horizontal disposition. Such a transport member is disclosed in U.S. Pat. No. 5,165,340 to Karlyn et al, above-mentioned, the entire disclosure of which is herein incorporated by reference. As shown in FIG. 1, the annular-shaped transport member 10 is defined by inner and outer, vertically disposed, concentric, curved peripheral edges only one of which peripheral edge 12 is shown. These edges are defined by predetermined inner and outer diameters, and top and bottom, parallel, planar, horizontally disposed surfaces 14, 16. The transport member 10 is fixedly connected at its inner peripheral edge (not shown), in conventional manner, to the rotary head of a conventional indexer (not shown).

On the top surface 14 of the annular-shaped transport member 10 are provided a plurality of compact disc fixtures such as indicated by reference numeral 18 in FIG. 1. These are provided in a circular-defined path, in predetermined spaced-apart locations. The compact disc fixtures 18 are each defined by top and bottom planar, parallel, horizontally disposed surfaces 20, 22, and vertically upright inner and outer edges 24, 26 and side edges (not shown). Outer edge 26 can, if desired, be curved, and concentric with the curved edge 12 of the transport member. The inner edge 24 can be curved, or linear, as desired. The side edges (not shown) can lie on a radius of the annular-shaped transport member, if desired, or be parallel to one another. The specific outline or configuration of the disc fixture 18 is of no particular concern to the practice of the invention other than as herein after disclosed. These disc fixtures are each supported by and are fixedly connected (not shown) to the top planar surface 14 of the rotable transport member 10, according to usual techniques. This can be accomplished, for example, by means of threaded fasteners.

Each disc fixture 18 is further defined by a centrally located annular-shaped well or nest 28 provided in the top planar surface 20 of the fixture which is, in turn, defined by a bottom horizontally disposed, planar, annular-shaped surface 30 parallel to top planar surface 20, a vertically upright outer peripheral edge or surface 32, and a vertically upright inner peripheral edge 34, concentric to edge 32. In the bottom planar surface 22 of the disc fixture there is provided a second annular-shaped well 36 concentric to well 28 in top surface 20. This well is defined by a horizontally disposed annular-shaped planar surface 38 parallel to surface 30 and the top surface 22 of the transport member, vertically upright outer peripheral edge 40 and inner peripheral edge 42.

The two annular-shaped, concentric wells 28, 36, are in communication with one another through eighteen (18) circular-shaped openings provided in the bridge 48 defined by the planar bottom surfaces 30, 38 of the wells, the purpose for which will soon be made clear. Only two openings 44, 46 are shown in the drawing for sake of clarity; however, it will be appreciated that the openings are desirably uniformly spaced apart in the bridge 48. Although eighteen such openings have been provided in the practice of the invention, it will be appreciated that a larger number or a fewer number of openings can be provided, as desired, provided such function to accomplish the purposes hereinafter disclosed.

In the tooling nest or well 28, there is provided an annular-shaped disc support member 50 upon which the compact disc 52 is supported in the disc fixture while being transported through the various work stations (not shown) and finally unloaded. This disc support member is provided with a like number of openings as provided in bridge 48, each of which extends through the support member from the top, horizontally disposed, planar surface 58 thereof to the bottom surface 60, parallel thereto. The support member is oriented in the well so that the openings provided therein, represented by openings 54, 56 and in bridge 48, are concentric with one another. This is important so that the openings in the disc support member 50 communicate with the bottom well 36.

The disc support member 50 can be of various materials. A primary consideration is that the support member be of a material that will not cause scratches or otherwise mar the surface of the compact disc. The support member can be of an elastomeric material such as silicone or neoprene rubber. Compositions of such elastomers can be compounded in accordance with known techniques to provide any property desired, e.g., flexibility, hardness, etc. The support member can, if desired, comprise a member coated or impregnated with such a composition. Whatever the support member is constructed of, the surface thereof in contact with the surface of the compact disc should be, preferably, characterized by low frictional characteristics relative to those of the compact disc. Thus, a scratch on the compact disc surface is less likely to occur from any slight movement of a compact disc across the support member during placement and registration of the compact disc in the disc fixture.

The inner peripheral edge 34 of well 28 defines the outer vertically disposed surface of the annular-shaped, centrally disposed, member 68. This member is further defined by inner, vertically disposed, circular-shaped surface 70. This latter surface is concentric to inner peripheral edges 34, 42 of wells 28, 36. Member 68, as shown by FIG. 1, is integral with bridge 48 and is in direct opposition to a like annular-shaped member 72 integral with and on the opposite side of bridge 48. The outer and inner vertically disposed surfaces of the two opposed, annular-shaped members 68, 72 are concentric with one another, as seen in FIG. 1. The planar bottom surface 74 of the bottom member 72 is in direct contact with the horizontally disposed top surface 14 of the annular-shaped transport member 10.

As shown by FIG. 1, the vertically disposed peripheral surfaces 34 and 70 terminate in top horizontally disposed surface 76 which lies in a plane below and parallel to that of the top planar surface 20 of disc fixture 18. As will be somewhat better appreciated by reference to FIG. 2, the top surface 76 also lies in the same horizontally disposed plane as that defined by the top surface 58 of disc support member 50, thus allowing the compact disc 52 to reside in the well 28 and its top planar surface 66 to be in the same horizontal plane as that defined by the top planar surface 20 of the disc fixture 18. This is of critical importance so that during the silk-screen printing of a compact disc 52, believed described fully in U.S. Pat. No. 5,165,340 earlier disclosed, the squeegee (not shown herein) will engage one continuous, horizontally disposed, planar surface. Although not shown in the drawings, the transport member 10 can be supported in known manner.

At the location of each disc fixture 18, there is provided a vertically disposed cylindrical-shaped opening in the transport member 10 such as indicated by reference numeral 78. This opening provides communication between the well or plenum 36 and a conventional pneumatic operated two-way valve 80 (FIG. 1) located below the dial 10 and fixedly secured thereto and to bottom surface 16, according to usual techniques. Connected to the valve 80 is one end of a tubular conduit 82, the other end (not shown) being connected to an annular-shaped vacuum manifold (not shown herein, but fully disclosed in U.S. Pat. No. 5,165,340). Thus, vacuum can be provided independently to each of the compact disc fixtures 18. Accordingly, a compact disc 52, loaded into the well 28 (FIG. 2) can be held by the vacuum securely against the disc support member 50 after registration of the compact disc and while such is being transported through the various silk-screen printing or other work stations (not shown in the drawings).

Operatively associated with the valve 80, as shown in FIG. 1, is a conventional rotary actuator mechanism 84 (fixedly secured to the frame—not shown) for automatically opening of the valve at that particular location on the transport member or dial 10 when the transport member is indexed to the loading station whereby vacuum is applied to the compact disc 52 as it is being loaded into and centered in the well 28 of disc fixture 18. A like valve actuator mechanism is located at the unloading station (not shown) so that a particular valve can be automatically closed and the printed compact disc fixture already indexed to that station can be readily off-loaded from the transport member 10. Those skilled in the art will readily appreciate that various conventional two-way valves and actuating mechanism therefor can be used in the practice of the invention, provided they accomplish the functions described herein.

The valve 80 used in the practice of the invention is available commercially from Clippard Instrument Laboratories of Cincinnati, Ohio. The valve used is a conventional 4-way, double acting, stem operated detent valve. This valve comprises, in general, an elongated horizontally disposed body member 86 having an internal piston (not shown) capable of opening and closing off the inlet opening provided in the valve, designated generally by reference numeral 88 and connected to the vacuum conduit 82 at its discharge end (FIG. 1). The internally located piston in valve 80 is caused to operate, in general, by elongated, horizontally disposed, opposed upstream/downstream members capable of reciprocal in/out operation, the upstream member being shown in FIG. 1 and identified generally by reference number 90, provided in the valve body 86 on opposite sides of the piston.

The actuator means 84 used in the practice of the invention comprises, in general, an elongated lever 92 capable of rotary movement in a clockwise direction, at the loading station, and counterclockwise at the off-loading station. When activated, the lever 92 functions to push in the valve member 90 at the loading station causing the valve 80 to be opened to the vacuum source. At the off-loading station, the rotating lever 92 operates to push in the valve member (not shown) opposing member 90 to close off vacuum to the valve. Thus, the compact disc 52 can now be off-loaded from the transport member 10, as desired, and provided in a vertically disposed stack of a plurality of discs. One form of an actuator mechanism which has been found satisfactory is a conventional pneumatic rotary actuator commercially available from SMC Pneumatic Inc. of Indianapolis, Ind.

As shown in FIG. 1, and in accordance with the invention disclosed herein, there is provided a registration means denoted generally by reference numeral 96. The registration means 96 is provided, importantly, on the underneath side of the transport member 10 and in operative association therewith, as disclosed more fully hereinafter. Registration means 96 comprises, in general, an elongated, vertically upright, circular-shaped member or registration pin 98 defined by a bottom end 100 and a top end 102. The top end of the circular-shaped registration pin 98 is seen to be defined by a planar, circular-shaped, horizontally disposed surface 104 and a curved peripheral surface 106. This latter surface extends downwardly from the peripheral edge of surface 104 and terminates at its bottom end providing a smooth transition with the vertically disposed peripheral surface 108 of the elongated registration pin. As will be seen in FIG. 1, the circular-shaped top surface 104 is defined by a peripheral edge concentric to the peripheral surface 108 of the registration pin. Thus, as will be more readily appreciated hereinafter, the top end of the registration pin has no sharp points or edges that might possibly cause marring of the bottom surface of the compact disc, or the peripheral edge of the conventional centerhole 110 provided in the compact disc 52. Although, in the more preferred aspects of the invention, registration pin 98 is seen to be defined by a flat top surface, the top end can be rounded, if desired. The main consideration with respect to the top end of the registration pin is that such not have a sharp point or edge whereby a scratch or other marring of the compact disc bottom surface might be caused.

Figure 2:
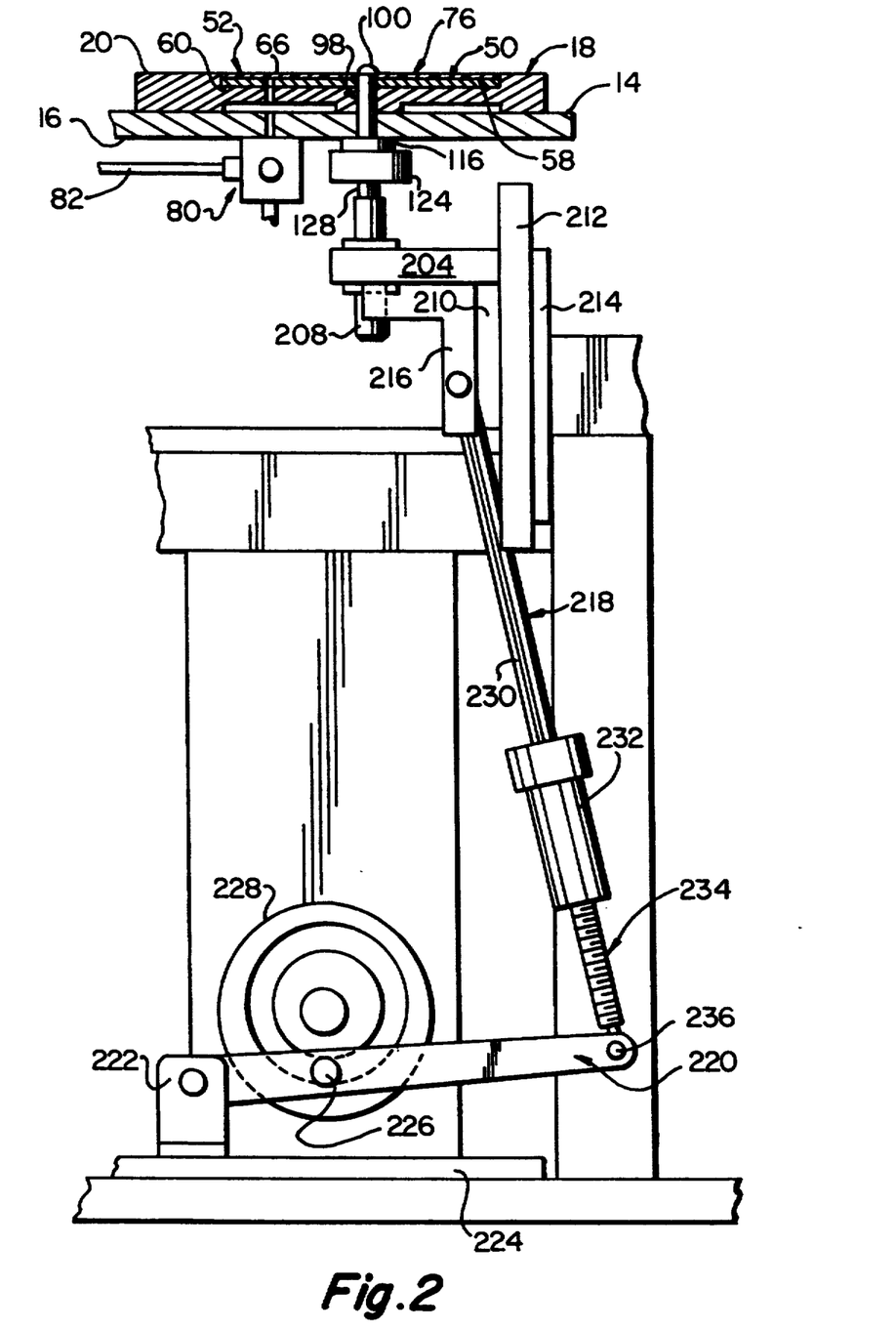
FIG. 2 is a schematic view of a registration means according to the invention as shown in FIG. 1, and further showing a means according to the invention for causing the elongated registration pin to be raised vertically upwardly and then withdrawn vertically downwardly, the registration pin being shown in operative association with the centerhole of the compact disc loaded into the disc fixture just prior to the pin being retracted from the centerhole of the disc.

The diameter of the registration pin 98 is of a somewhat lesser diameter than that of the elongated opening 112 provided in dial 10, and the opening 70, concentric thereto, defined by the annular-shaped body members 68, 72 so as to be freely movable the length thereof, as seen in FIG. 2. There should be no constraint laterally on the up and down movement of the registration pin 98 by the peripheral surfaces surrounding the pin. As can be seen from the drawings, in particular FIG. 1, the opening 112 is critically concentric to the inner peripheral surfaces of the members 68, 72.

The bottom end 100 of the elongated registration pin 98 (FIG. 1) is fixedly secured to the top, planar, horizontally disposed surface 114 of pin base member 116. This can be accomplished by various conventional techniques, e.g., a threaded fastener. Nevertheless, if desired, the registration pin 98 and pin base member 116 can be integral with one another, such being machined from appropriate bar or round stock. The base member 116 is further defined by a circular-shaped, vertically disposed peripheral edge 118 and a bottom, horizontally disposed planar surface 120, parallel to the top surface 114.

Nevertheless, it should be appreciated that the particular shape or configuration of the pin base member 116 is of no consequence to the practice of the invention. The pin base member 116 can be of square or other shape, as desired. The only requirements are that the registration pin 98 be held in a vertically upright position. Thus, in operation, as later more fully disclosed, the registration pin 98 will be moved vertically upwardly, passing through the elongated openings 112 and 70 without restriction. Registration means 96 must be, as will be appreciated by those skilled in the art, so mounted on the machine that the elongated centerline of the vertically disposed registration pin 98 and that of the elongated openings 112 and 70 will be concentric and in alignment with one another. That being the case, and as will be later more fully appreciated, as the compact disc 52 is loaded into the disc fixture, registration pin 98 causes the disc to be precisely centered within the annular-shaped well 28.

The registration pin 98 provided in the registration means need be of a corrosion resistant material that is capable of providing high tolerance relative to the diameters of the openings 112, 70 and of the centerhole of the compact disc. For example, the diameter of the registration pin must be, and this is of critical importance, only about 2–3 mils smaller than that of openings 112, 170 and the centerhole of the compact disc.

The bottom surface 120 of pin base member 116 is supported on the top planar surface 122, as shown by FIG. 1, of docking base 124. The docking base 124, in this embodiment of the invention, is fixedly connected at its bottom horizontally disposed surface 126 to the top end of vertically disposed elongated member 128. This can be accomplished by various conventional techniques, e.g. soldering. In this case, a dead bore 130 of suitable dimensions can be provided in the bottom surface 126 of the docking base into which the top end of member 128 is located (See FIG. 3). Docking base 124, as shown in the drawings, is of circular-shape and defined by vertically disposed peripheral surface 132; however, it can be of any shape desired. The only consideration is that registration pin 98 be so mounted relative to the docking base that it be provided in a vertically upright disposition and its centerline be aligned and concentric, as earlier disclosed.

The registration pin 98 need not necessarily be supported by a pin base member 116 such as shown in the drawings. Instead, the registration pin can be fixedly connected to the top surface of the docking base 124. Nevertheless, the elongated centerline of the registration pin need be coincident with the elongated centerlines, of openings 112 and 70. Thus, when in its raised position, as shown in FIG. 2, the elongated centerline of the registration pin 96 will coincide with the center of the centerhole 110 of the compact disc.

Figure 3:
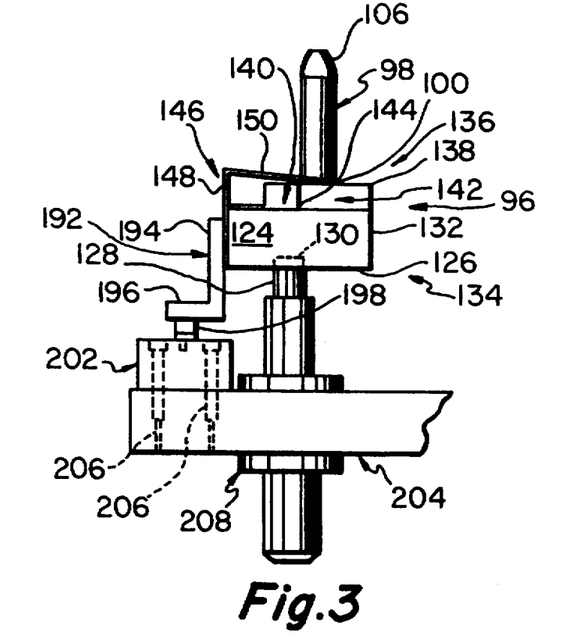
FIG. 3 is a schematic view in front elevation of a more preferred registration means according to the invention, showing a preferred registration pin assembly according to the invention which allows the registration pin to be sheared from a supporting member therefor during the operation of the printing machine for the silk-screen printing of compact discs, to prevent possible damage to the elongated registration pin or to other parts of the silk-screen printing machine in the event of a faulty operation.

Turning now to FIG. 3 of the drawing there is disclosed therein a further, more preferred, embodiment of a registration means 96 according to the invention. The registration pin assembly 134 shown in FIG. 3 comprises a circular-shaped docking base 124 (as in FIG. 1) defined by top and bottom horizontally disposed surfaces 122, 126 and vertically disposed peripheral surface 132. On the top surface 122 there is detachably supported a registration pin means comprising an elongated registration pin 98 and a further pin base member 136. The bottom end 100 of the registration pin 98 is fixedly secured to the top planar, horizontally disposed surface 138 of the circular-shaped pin base member such as earlier disclosed with respect to pin base member 116. Importantly, however, the pin base member 136 comprises a first portion or part 140, to the left side of the pin, as seen in FIG. 3, of magnetized material, i.e. a magnet, and a second portion or part 142 to the right of the left side of registration pin 98, of magnetic material, i.e., material capable of being attracted by a magnet. These two separable portions of the pin base member 136 are attracted one to the other and are releasably held together at their mating edges, denoted generally by reference numeral 144. As shown by FIG. 3, the portion 142 of pin base member 136 to which the bottom end of registration pin 98 is fixedly secured is somewhat larger than the portion 140.

That portion 140 of the pin base member 136 can, for example, be a magnet of a "horseshoe" shape, its poles being determined by the vertically disposed mating edge 144. Thus, portion 142 of the pin base member 136 will be attracted to the portion 140 and the registration pin releasably secured in the pin base member 136. Moreover, the portion 140 of pin base member 136 is also attracted to the top surface of the pin docking base 124. Thus, when the upright registration pin 98 encounters a force laterally disposed to its length, the registration pin is caused to be sheared from its operating location, i.e., the shearing force overcomes the attracting force of the magnet, i.e., pin base member portion 140. The portion 142 of the pin base member 136 detaches itself from the portion 140 and from its location on the top surface 122 of the docking base.

The pin base member 136 can be configured differently, if desired. Thus, the larger portion 142 encompassing the bottom end of the registration pin 98 can be reversed, i.e., the mating edges 144 can be located below the right side of the registration pin, rather than the left side, as shown in FIG. 3. In that case, that portion of the pin base member to the left of the right of pin 98 can be of magnetic material. Moreover, if desired, that portion identified in FIG. 3 by reference numeral 140 can be of magnetic material and portion 142 can be a magnet.

The magnet portion 140 can be, and preferably is, fixedly secured to the top surface of the docking base 124. This can be accomplished by various conventional means e.g. threaded or screw means. Or, if desired, pin base member portion 140 need not be a magnet. Instead, the magnet can be provided in the top surface 122 of the docking base. Thus, a magnet, e.g., a horseshoe magnet, can be inset into a cavity (not shown in FIG. 3) provided in the top surface of the docking base 124 so as to be located directly below pin base member portion 142 in opposition to the bottom end of the registration pin. Though somewhat less preferred, the entire pin base member 116 can be a magnet. Thus, the registration pin 98 being of magnetic material is then releasably held to the docking base. Or the registration pin being of magnetic material can be detachably held at its bottom end 100 to the top surface of the pin base member.

The registration pin base member 136 such as shown in FIG. 3 is, in certain preferred aspects of the invention, further held releasably in contact with the top surface 122 of the pin docking base 124 by means of a restraining clip 146 which comprises a vertically disposed elongated member 148 and a spring member 150. The member 148 is fixedly connected, according to conventional technique, to the vertically disposed peripheral edge 132 of the pin docking base 124. The spring member 150 can be integral to, or fixedly connected to, the top end of member 148 and extends somewhat downwardly therefrom, and toward the bottom end 100 of registration pin 98. Thus, the spring member 150 is in pressure engagement with the top surface of the pin base member 136, i.e., portion 142, and aids in maintaining the pin base member in contact with the top surface of the docking base 124. The downward force provided by the spring member against the pin base member acts to stabilize and maintain that member in position on the pin docking base. This will better ensure that, if the registration pin is subjected to a shearing force and such is insufficient to dislodge the pin base member from the docking base, the registration pin will remain in its operative location, as the transport member 10 rotates and presents the next compact disc for registration.

The elongated spring member 150 is forked at its free end so as to partially surround the registration pin 98 at its bottom end 100, as will be readily appreciated, it is believed, from FIG. 3. A cut-out having the shape of half a circle of slightly larger diameter than registration pin 98 can be provided in the end of spring member 150. Thus, the registration pin 98 is releasably held in the vertical upright disposition until it encounters a laterally disposed force relative to its length sufficient to overcome the combined forces holding the pin base member 136 to the docking base 124. These combined forces, as will be readily appreciated by those skilled in the art, are provided by the restraining clip, i.e. the downward force vector of the elongated spring member 150 and the magnetic force on the pin base member portion 142 provided by the magnet or portion 140. At that time, i.e. when the combined forces are overcome, the magnetic portion 142 of the registration pin base member 136 is sheared from the top surface 122 of the docking base 124 whereby no harm is caused to the registration means 98 or other parts of the printing system.

Those skilled in the art will readily appreciate, it is believed, that a laterally disposed force on the elongated registration pin will be encountered by the rotatable transport member engaging the registration pin if such fails for some reason to be properly retracted during operation, as later more fully disclosed. Heretofore, when such an encounter occurred, the registration pin assembly, at the least, was damaged and needed to be replaced. Quite advantageously, however, the shearable registration pin of this invention is not damaged, in such a case. And, neither are other parts of the printing machine. If a shearing force is encountered and the registration pin 98 or pin base member 136 or a portion thereof, as earlier disclosed, is dislodged from the docking base 124, the sheared-off portion of the pin base member can be merely repositioned on the docking base and used again. The potential amount of shearing force to be encountered by registration pin 98 will be determined by a number of factors. These include, among other considerations, the rotational speed of the rotatable member, the location on the vertically disposed registration pin that encounters the force, whether the registration pin is at its uppermost location, etc. Those skilled in the art can readily determine that amount of force to be most desirably protected against, beyond which would result in excessive damage to the registration means and, perhaps, other parts of the silk-screen printing machinery. Thus, having made such an arbitrary determination, a magnet of the desired holding force, and an appropriate restraining clip, if desired, for the pin base member can be chosen to allow the registration pin or pin base member to be sheared from the pin docking base at any force encountered beyond that.

Figures 4, 5:
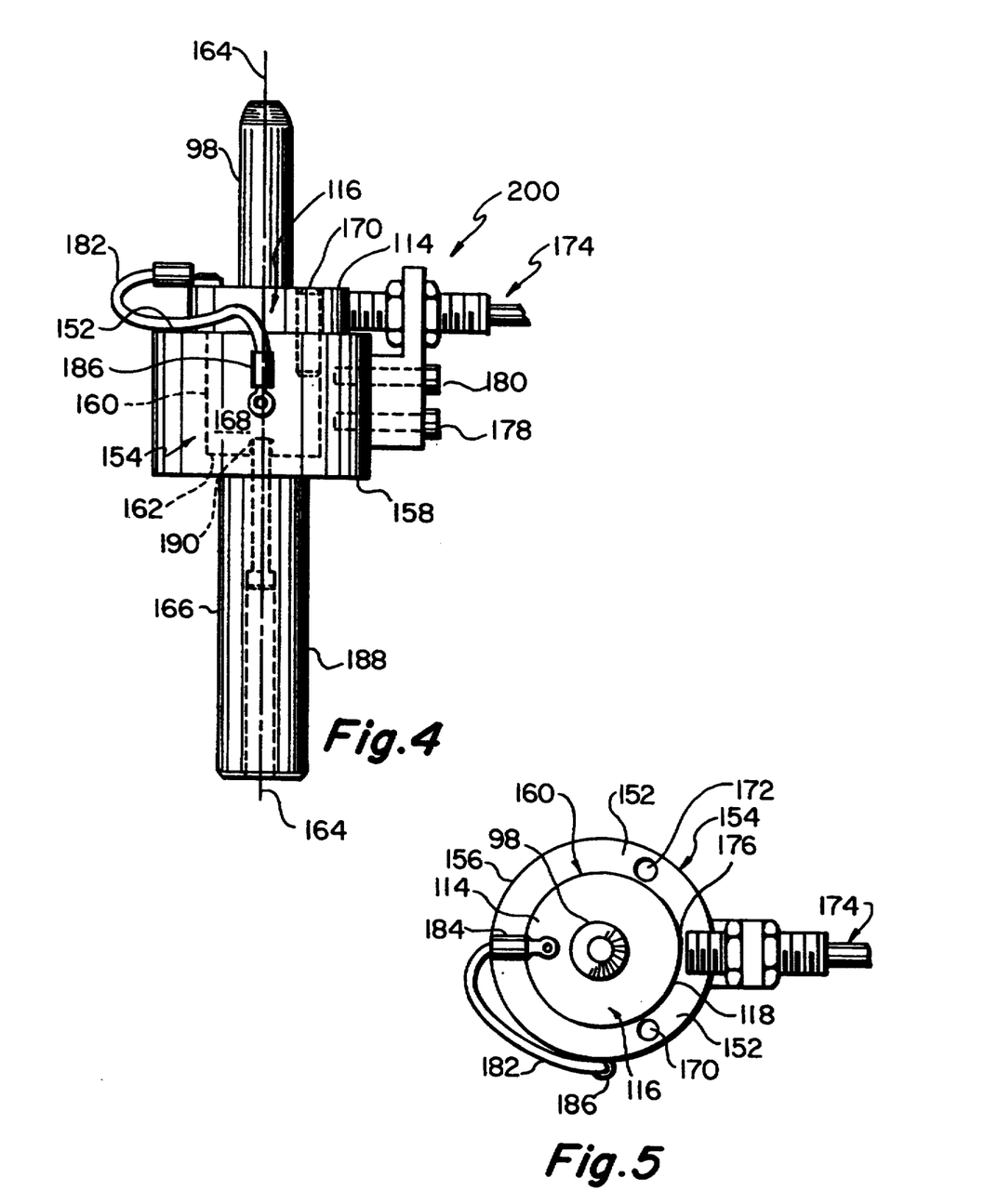
FIG. 4 is a side elevation of an even more preferred shearable registration pin assembly according to a further aspect of the invention.
FIG. 5 is a top plan view of the shearable registration pin assembly shown in FIG. 4.

Turning now to FIGS. 4 and 5 of the drawing, there is shown therein a further, even more preferred, embodiment of a registration means 200, in accordance with the invention. The registration means 200 comprises, in general, a registration pin 98 fixedly secured at its bottom end to the top surface 114 of a pin base member 116, as disclosed in FIG. 1, i.e. a unitary structure. The pin base member 116 is releasably secured at its bottom surface 120 to the top surface 152 of a pin docking base or support member 154. The pin docking base 154, as best seen from FIG. 5, is of a cylindrical-shape being further defined by a vertically disposed peripheral edge 156 and a bottom, horizontally disposed, surface 158. In the top surface 152, there is provided an open-top, circular-shaped cavity 160 defined by a horizontally disposed bottom 162. The cavity 160 extends inwardly from the top surface 152 and is concentric to the cylindrical-shaped docking base 154. An imaginary longitudinal centerline 164 passes through the centrally disposed registration pin 98, and the centers of pin base member 116, docking base 154, and the vertically disposed elongated member 166.

Located in the centrally disposed cavity 160 is an ALNICO permanent magnet 168 available commercially from Bunting Magnetics Co. of Newton, Kans. Such a magnet having a holding force of about 36 lbs. will be found to provide suitable attraction to the pin base member 116 which is, most desirably, of conventional nickle-plated cold rolled steel. Nevertheless, it will be appreciated that other magnets, and of a different holding force can be used in the practice of the invention. The choice of any particular magnet will depend upon the attractive force desired, i.e., the predetermined maximum holding force to resist the pin base member (hence the registration pin) from being sheared off or dislodged from its operative position on the docking base.

On the top surface 152 of the pin docking base 154 there are provided two spaced-apart, circular-shaped, vertically disposed, elongated guide pins 170, 172. The bottom ends of the guide pins are located in dead bores provided in the docking base and extending vertically downwardly from the top surface 152. The guide pins are seen (FIG. 4) to each terminate at their top ends in a plane defined by the top surface 114 of the pin base member 116. Nevertheless, the length of these pins is of no real consequence to the practice of the invention provided they perform the function disclosed more fully hereinafter. The diameter of the guide pins can vary somewhat; however, a guide pin having a diameter of about ¼" will be found quite satisfactory. A guide pin having a diameter less than about ⅛" inch is less satisfactory due to the fact that such can more readily be damaged, e.g. broken off or bent from the vertical.

The centers of the two guide pins 170, 172 importantly each lie on the same circle concentric to the center of the docking base 154. And, also of importance is that the guide pins be of the same diameter. Thus, when the pin base member 116 is properly located, and in operative position, on the docking base 154, the guide pins will each make contact with the pin base member 116 at its circumference, i.e., at a tangent point, as will be appreciated from FIG. 5.

The location of the guide pins on the docking base, and their relative locations to one another and with respect to the circumference of the pin base member 116 is of critical importance. Otherwise, the registration pin 98 may be out of registration with the elongated opening 112 provided in the rotatable transport member 10. The angle between the two guide pins can be varied somewhat; however, it has been discovered in the practice of the invention that an angle from about 90 to about 120 degrees will be found quite satisfactory.

As best shown by FIG. 5, the pin base member 116 when properly seated on the docking base is directly opposed by a conventional inductive proximity switch indicated generally by reference numeral 174. Such a proximity switch available commercially from Effector, Inc. of Farmington, Conn. will be found quite satisfactory for the intended purposes. The location of the detection member 176 of the switch is directly opposed to pin base member 116 at its peripheral edge 118. Importantly, however, the switch 174 must provide recognition that the pin base member 116 is in tangential contact with both of the guide pins 170, 172. The proximity switch 174 is fixedly secured to the peripheral edge 156 of pin docking base 154. This can be accomplished as shown in FIG. 4, by conventional threaded fasteners 178, 180 which are threaded into threaded dead bores provided in the peripheral edge of the docking base.

The pin base member 116 is connected to the pin docking base 154 by means of an elongated piece of wire 182, one end 184 of which is connected by conventional threaded means to the top surface 114 of the pin base member 116 and the other end 186 of which is connected to the peripheral edge of the docking base. Thus, the registration pin 98, if dislodged from the docking base, is prevented from falling to the floor or into other parts of the silk screen printing apparatus where possible damage might result, either to the pin itself or to other components of the printing machine. The pin base member is prevented from falling any further than the length of the connector or wire 182. This being the case, the registration pin can be readily retrieved without need to search therefor and the pin base member 116 can be readily assembled once again with the docking base 154. The guide pins 170, 172 ensure that pin base member 116 is properly seated on the docking base so that the registration pin 98 is properly aligned with the vertically disposed opening 112 in the transport member. The proximity switch operates to cause the transport member 10 to rotate or not, depending upon whether the pin base member 116 is properly centered relative to a disc fixture.

The elongated shaft or member 166 is connected (FIG. 4) at its top end to the bottom surface 158 of the pin docking base 154. Thus, the planar end surface of the elongated member 166 abuts against the bottom surface and the elongated member is fixedly secured to the docking base by a conventional threaded member 188. The end of the threaded member 188 is threaded into a dead bore provided in the bottom of the magnet such being provided with a complementary internal thread pattern 190.

Referring again to FIG. 3, it will be seen that the docking base 124 therein is optionally connected to an L-shaped bracket member 192 having vertically and horizontally disposed members 194, 196. The vertically disposed member 194 can be attached to the docking base by various conventional means. The same means can be used that was used to connect the member 148 of restraining clip 146 to the pin docking base. The horizontally disposed bracket member 196 is fixedly connected to the end of an elongated piston rod 198 associated with the elevating piston or cylinder 202. The elevating cylinder 202 is fixedly secured to a support member or base 204 by conventional means such as threaded fasteners indicated generally by reference numeral 206. The purpose for such a cylinder will soon be made clear.

As earlier disclosed the bottom surface 126 of pin docking base 124 is provided with a dead bore 130 into which intrudes the top end of a vertically disposed elongated shaft 128. This shaft and the docking base 124 are fixedly connected together according to usual techniques. The cylindrical-shaped shaft 128 is located within a conventional elongated guide bearing 208, supported in vertical fashion by the horizontally disposed base 204 and in perpendicular disposition thereto. Thus, as will be later appreciated, the bracket member 192 in combination with the elongated shaft 128 better ensures that registration pin 98 is raised in vertically upright fashion and, when raised, intrudes through opening 112 in the transport member 10 upwardly and through the concentric openings in members 68, 72 in the disc fixture 18 in proper fashion. The length of the registration pin 98 can, of course, vary to some extent as desired. The main thing is that the pin be long enough to be somewhat above the top surface of the disc fixture in its most elevated position (See FIG. 2).

The base member 204 is supported at its right end (FIG. 2) by the slide member 210 of a conventional crossed roller slide. This slide member is associated with the vertically disposed slide base 212 supported by frame member 214. Connected to the outer surface of the slide member 210 is the vertical portion of an L-shaped bracket 216.

As shown by FIG. 2, an elongated linkage 218 is provided which is pivotably connected in usual fashion at its top end to the vertically disposed portion of L-shaped bracket 216 and at its bottom end to one end of an elongated lever 220. The other end of lever 220 is pivotably connected to a vertically upright member 222 in conventional manner which is fixedly connected to a frame member 224. The lever 220 is provided with a cam roller or follower 226 associated in usual fashion with a conventional box cam 228. This cam provides for a light dwell when the registration pin 98 is in its up position, as later more fully disclosed, and a relatively long dwell when the registration pin is in its lower position. A suitable cam for the intended purposes can readily be provided by those skilled in the art.

The elongated linkage 218 is most preferably a collapsible link having a detent shaft 230 and a detent housing 232. The manufacture and construction of such a link is well known to those in the art. An elongated support shaft 234 is threadably connected at its one end to the bottom end of the detent housing in usual fashion, as is shown in FIG. 2. The lower end 236 of the shaft 234 is pivotably connected according to conventional technique to the outer end of lever 220.

In operation, the rotable transport member 10 is indexed to the load position. At that time, the cam 228 operates to cause lever 220 to rise which, in turn, causes slide member 210 to rise vertically upwardly. This causes registration pin 98 to rise vertically upwardly to its uppermost elevated position, as shown in FIG. 2. A compact disc 52 is placed into the disc fixture, the rounded top end 100 of the registration pin 98 intruding into the centerhole 110 of the disc as seen in FIG. 2, by the loading means (not shown). The registration pin 98 being concentric to the openings 112 and 70 causes the compact disc 52 to be centered in the fixture well 28 and registered in the proper location for subsequent silk-screen printing.

At the moment the compact disc 52 is centered on the support member 50, the registration pin 98 is withdrawn from the centerhole of the compact disc while, at the same time, vacuum is provided to the fixture well and to the bottom surface of the compact disc whereby to maintain the compact disc in its centered position. These actions are all precisely coordinated according to usual techniques by means of a Programmable Logic Control (not shown). Such a control is commonly known by those in the art. One Programmable Logic Control ("PLC") that will be found suitable is available under the trade designation OMRON SYSMAC C200H from OMRON Electronics Inc. of Schaumberg, Ill. As will be readily appreciated by those in the art, however, other programmable control devices can be used. The programming of the PLC to provide automatic and cooperative operation of the various components of the system including the registration means disclosed herein can be readily accomplished by a skilled programmer.

In some cases, a user may desire to have silk-screen printing apparatus wherein compact discs may be loaded onto the transport member two at a time, e.g., where two different colors are being applied to the disc. Accordingly, a registration means 96 will need be provided for each of two next adjacent disc fixtures 18. Thus, as the two discs are being loaded onto the transport member, the registration pins will both be in the up position, to cause each of the compact discs to be centered. The two registration pins are then caused to be lowered simultaneously to allow indexing of the transport member for printing of the compact discs and loading of the next two discs. The two registration means can each be installed on its own base or both can be provided on a common base, as desired.

Figure 6:
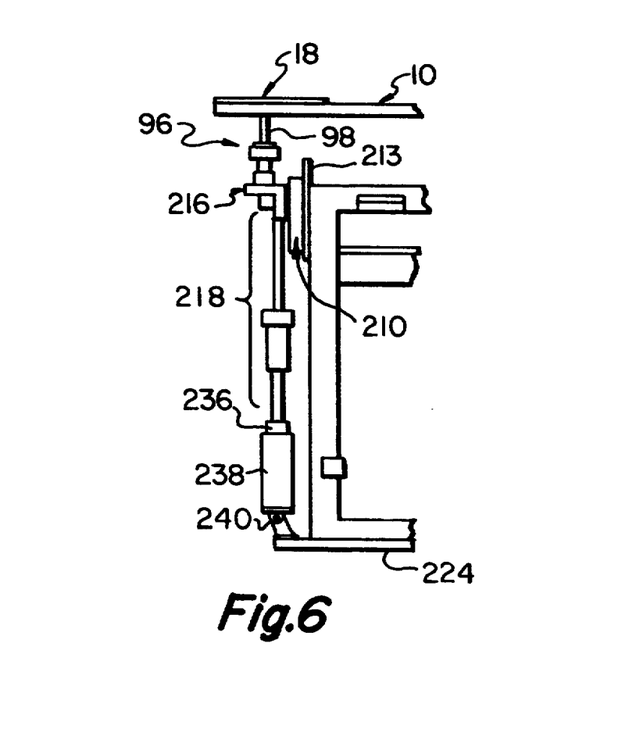
FIG. 6 is a schematic view of a registration means according to the invention showing a pneumatic means for causing vertical up and down movement of the registration pin, rather than the mechanical means shown in FIG. 2.

Turning now to FIG. 6, there is shown therein a further embodiment of the invention. In this embodiment, the operation of the registration means 96 is by pneumatic means later described, rather than by mechanical means as disclosed in FIG. 2. The collapsible link 218, as shown in FIG. 6, is attached at its top end to the vertical arm of the L-shaped member 216 as indicated. The bottom end of the link 218 is connected to the outer end of rod 236 of a conventional air cylinder or piston 238. The bottom end of the air cylinder 238 is connected to a conventional clevis mount 240 according to usual technique. The clevis mount 240 is fixedly connected to a frame member 224.

Importantly, in this embodiment of the invention, the operation of air cylinder 238 causes the piston rod 236 to be raised vertically upwardly. This motion, in turn, causes the collapsible link 218 and the slide member 210 also to be elevated vertically upwardly. The registration pin 98, as earlier described, is caused to be raised vertically upwardly by slide member 210 for centering of a compact disc as such is loaded into the disc fixture 18. The registration pin is then retracted and the transport table indexed so the next compact disc can be loaded. Thus, the operation of this embodiment of the registration means 96 is essentially the same as the mechanically operated one earlier disclosed. The main difference is that pneumatic means is substituted for the cam and lever, and there are not pivotal connections.

As understood by those skilled in the art, various modifications and changes can be made in the invention and its form and construction without departing from the spirit and scope thereof. The embodiments of the invention disclosed herein are merely exemplary of the various modifications that the invention can take and the preferred practice thereof. It is not, however, desired to confine the invention to the exact construction and features shown and described herein, but it is desired to include all such as properly come within the spirit and scope of the invention disclosed and claimed.

What is claimed is:

1. Registration apparatus for use in silk-screen printing apparatus for the registration of a compact disc defined by a planar top surface prior to providing printing on said top surface, said printing apparatus comprising a horizontally disposed rotable annular-shaped transport member defined by a top and bottom surface, a plurality of compact disc fixtures being located in predetermined spaced-apart locations on said top surface, and at least one silk-screen printer being located in operative association with the transport member for the printing of the top surface of a compact disc, said registration apparatus comprising an elongated circular-shaped registration pin being defined by a rounded top end and a bottom end, a pin base member defined by a top surface and a bottom surface, the bottom end of the registration pin being fixedly connected to said top surface of the pin base member and being supported thereby in a vertically upright manner, the vertically upright registration pin defining at its bottom end one portion of the pin base member to the right of the bottom end where the registration pin is supported by the pin base member and a second portion of the pin base member to the left of said one portion, a docking base defined by a top surface and a bottom surface, means detachably supporting the pin base member to the top surface of the docking base, said means including the one portion of the pin base member being of magnetized material and the second portion being of magnetic material whereby the two portions of the pin base member are attracted to one another and held detachably together as a unit.

2. Registration apparatus according to claim 1 further comprising means for additionally holding the pin base member against the docking base, said holding means comprising a vertically disposed member having a top end and a bottom end being connected to said docking base, and an elongated spring member having an outer end and a free end, said outer end of the spring member being connected to said top end of the vertically disposed member whereby the spring member is directed inwardly toward the circular-shaped registration pin and downwardly toward the top surface of the pin base member, the spring member being defined at the free end by a forked end and being of such a size as to conform to the circular-shaped registration pin and to partially surround the registration pin at its bottom end, the spring member exerting a predetermined downward force on the pin base member whereby the bottom surface of the pin base member is held against the top surface of the docking base until a sufficient laterally disposed force is encountered by the elongated registration pin to overcome the attractive force of the magnetized material against the magnetic material and the downward force of the spring member.

3. Registration apparatus for the centering of a disc-like member of predetermined diameter in a fixture therefor, said fixture being defined by a top horizontally disposed planar surface and an annular-shaped well of predetermined inner and outer diameters extending inwardly from said top surface and terminating in an annular-shaped horizontally disposed bottom surface defined by a plane parallel to said top surface of the fixture, said well being further defined by a centrally disposed annular-shaped body member concentric to said annular-shaped well and defined by a top planar surface in which is provided a centrally disposed vertically upright circular-shaped elongated opening, said registration apparatus comprising:

(a). an elongated circular-shaped registration pin of predetermined diameter concentric to said well and defined by a top end and a bottom end, said bottom end being defined by a horizontally disposed planar surface, and said top end of the registration pin being defined by a planar, circular-shaped surface parallel to the bottom end planar surface and defining a circular-shaped periphery concentric to the circular-shaped registration pin;

(b). a circular-shaped pin base member of predetermined diameter concentric to said well and defined by horizontally disposed, parallel top and bottom planar surfaces supporting the elongated registration pin in vertically upright manner, said registration pin being fixedly secured at its planar bottom end to the top surface of the pin base member and being located centrally thereon;

(c). a circular-shaped docking base defined by a top planar surface supporting the bottom surface of the pin base member, said pin base member being centrally disposed on the docking base, the registration pin, pin base member and docking base being located on and defining a vertically upwardly extending centerline; and (d). magnet means being provided in said docking base and extending inwardly from the top surface thereof for releasably holding the pin base member in supporting contact with the docking base.

4. Registration apparatus according to claim 3 wherein the pin base member and docking base each define a vertically disposed peripheral surface, the predetermined diameter of the docking base being greater than that of the pin base member, and the registration apparatus further comprises spaced-apart circular-shaped, elongated guide members each being defined by a vertically disposed peripheral surface and being located on the top surface of the docking base, the peripheral surface of the guide members each define a centerline, said peripheral surfaces of the docking base and pin base member each being defined by a centerline and extending in concentric vertical upright disposition from said top surface of the docking base, the centerline of each said guide member being parallel to the centerline of the docking base and lying on a circle of a predetermined diameter greater than that of the pin base member but less than that of the docking base whereby when the pin base member is properly seated on the docking base the peripheral surface of the pin base member will be in tangential relationship with the peripheral surfaces of the guide members, and the registration pin will be provided in proper vertical alignment with the centrally disposed elongated opening in said fixture.

5. Registration apparatus according to claim 4 further comprising means for detecting the presence and proper seating of the pin base member on the docking base.

6. Registration apparatus according to claim 5 wherein the detecting means is a proximity switch.

7. Registration apparatus according to claim 3 further comprising means connecting the pin base member to the docking base whereby the pin base member can be displaced from the docking base only a predetermined limited distance.

8. Registration apparatus according to claim 3 further comprising a frame member, and means connected to said docking base and being mounted to said frame member to provide vertical up and down movement of the docking base a predetermined distance.

9. Registration apparatus according to claim 8 wherein the means providing vertical up and down movement of the docking base comprises mechanical means.

10. Registration apparatus according to claim 9 wherein said mechanical means comprises an elongated collapsible linkage.

11. In apparatus for the silk-screen printing of a plurality of compact discs one-at-a-time in predetermined timed sequence comprising in combination a horizontally disposed annular-shaped member rotatable about a center point defined by predetermined inner and outer diameters and having top and bottom planar parallel surfaces for transport of a plurality of compact discs in predetermined spaced-apart locations on the top surface of the rotatable member in a circular-defined path to and through at least one predetermined work station at least one of which stations is a silk-screen printer, a compact disc fixture being provided on the top planar surface of said annular-shaped rotatable member at each of the predetermined spaced-apart locations for such compact discs, each disc fixture being defined by top and bottom planar parallel spaced-apart surfaces, a horizontally disposed circular-shaped well defined by a vertically disposed circular-shaped peripheral surface having its top edge terminating in the top planar surface of the disc fixture and its bottom edge in a horizontally disposed bottom planar surface for receiving and supporting a compact disc in horizontal disposition the diameter of said well being only slightly larger than that of a compact disc, means for providing vacuum being operatively associated with said transport member for providing vacuum independently to each said compact disc fixture for holding of each said compact disc on said rotatable annular-shaped member while the disc is being transported from a loading position to an off-loading position in the circular-defined path, an annular-shaped horizontally disposed support member being defined by predetermined inner and outer diameters and having a center concentric with that of the said annular-shaped rotatable member and defining a planar top surface, said support member being fixed relative to said rotatable member and having an outer diameter such that the support member overlaps a portion of the said rotatable annular-shaped member inwardly from the inner diameter of the rotatable member, said support member being in and defining a horizontally disposed plane above and parallel to that defined by the said rotatable member, at least one silk-screen printer unit being located on and supported by said support member comprising a horizontally disposed screen frame extending outwardly from said printer unit and overlying said annular-shaped rotatable member at its outer peripheral edge, said screen frame being defined by a middle line dividing said screen frame in half, said middle line lying on a radius defined by said support member and being in the same vertical plane and coincident with the middle line defined by a compact disc location when such a location is located directly below a screen of the screen frame, and a squeegee being provided in operative association with said silk-screen frame which operates by stroking radially inwardly toward the center of the support member and outwardly away from the center, the improvement comprising in combination a single registration means for registering each compact disc as it is being loaded into the fixture therefor, said registration means being located below the bottom surface of the annular-shaped rotatable member and comprising a vertically upright elongated registration pin defined by a top rounded end and a bottom end, a pin base member being defined by a top surface and a bottom surface, said pin bottom end being fixedly connected to the pin base member at said top surface for holding said pin in vertically upright manner, a docking base defined by a top surface and a bottom surface, said pin base member being supported by and releasably held on the top surface of the docking base and means operatively associated with the bottom surface of the docking base capable of being raised vertically upwardly and downwardly a predetermined distance and for raising the registration pin vertically upwardly and then downwardly a predetermined distance.

12. In apparatus according to claim 11 wherein the improvement further comprises magnet means for releasably holding the pin base member on the too surface of the docking base.

13. Registration apparatus for providing a small disc-like member defined by a centrally disposed opening therein in registration on a horizontally disposed transport member prior to the performing of work on the disc-like member, said apparatus comprising an elongated registration pin defined by a rounded top end and a bottom end, a pin base member defined by a top surface supporting the registration pin at its bottom end whereby the registration pin is disposed in vertical, upright disposition, the bottom end of the registration pin being fixedly connected to the pin base member, said pin base member being further defined by a planar horizontally disposed bottom surface, and a docking base supporting the pin base member being defined by top and bottom surfaces parallel to one another and to the bottom surface of the pin base member, at least one of the pin base member and the docking base comprising a magnet and the other magnetic material, said docking base being detachably connected to the pin base member and being capable of being raised vertically upwardly and downwardly in a predetermined manner for raising and lowering of the registration pin, and means for raising the docking base vertically upwardly a predetermined distance whereby said top end of the registration pin intrudes into the centrally disposed opening when the disc-like member is being loaded onto the transport member to cause said disc-like member to be registered and then to retract the registration pin vertically downwardly so as to clear the centrally disposed opening.

14. Registration apparatus according to claim 13 wherein the pin base member comprises a magnet and the docking base comprises magnetic material.

15. Registration apparatus according to claim 14 wherein the pin base member comprises a first portion and a second portion and one of said portions is a magnet and the other of said portions is magnetic.

16. Registration apparatus according to claim 13 wherein the docking base comprises the magnet.

17. Registration apparatus according to claim 16 wherein a cavity is provided in the docking base which extends inwardly from the top surface thereof, and the magnet is located in said cavity.

18. Registration apparatus for registering a disc-like member of predetermined diameter in anticipation of performing work thereon, said disc-like member being defined by top and bottom planar surfaces and a centerhole of predetermined diameter, said registration apparatus comprising:
 (a). an elongated, circular-shaped registration pin of predetermined diameter less than that of the centerhole and defined by a top end and a bottom end;
 (b). a pin base member supporting the registration pin in vertically upright manner, said pin base member being defined by top and bottom surfaces, the bottom end of the registration pin being fixedly secured to the top surface of the pin base member;
 (c). a docking base defined by top and bottom planar parallel surfaces supporting the pin base member on the top surface of the docking base, and being capable of vertical up and down movement; and
 (d). means for raising the docking base vertically upwardly a predetermined distance whereby to cause the top end of the registration pin to intrude into the centerhole of the disc-like member whereby said disc-like member will be registered for subsequent work thereon, and then retracting the registration pin vertically downwardly a predetermined distance,
 said pin base member and said docking base each comprising magnet means whereby the pin base member is attracted to and releasably held in contact with the docking base.

19. Apparatus for centering a disc-like member defined by a centerhole and having a predetermined diameter in a fixture which is defined by a top planar surface and which comprises an annular-shaped well in its top surface, said fixture holding and supporting the disc-like member in a horizontal disposition comprising:
 (a). an elongated circular-shaped registration pin defined by a top end and a bottom end, said registration pin being of a somewhat lesser predetermined diameter than the diameter of the centerhole of the disc-like member;
 (b). a pin base member defined by a top surface and a bottom surface for supporting the elongated registration pin in a vertically upright disposition, the bottom end of the registration pin being secured to the top surface of the pin base member, said pin base member comprising a first portion located to one side of the bottom end of the registration pin where such is secured to the pin base member, said first portion being of magnetic material, and a second portion located to that side of the registration pin where such is not secured to the pin base member, said second portion of the pin base member being of magnetized material of a predetermined holding force whereby the first portion of the pin base member to which the bottom end of the registration pin is secured is releasably held to the second portion of the pin base member;
 (c). a docking base for the pin base member defined by top and bottom horizontally disposed, planar surfaces, the top surface supporting the bottom surface of the pin base member; and
 (d). means for causing the docking base to be raised vertically upwardly a predetermined distance whereby the top end of the elongated registration pin intrudes into the centerhole of the disc-like member and to be retracted vertically downwardly a predetermined distance whereby to be clear of the centerhole.

20. Registration apparatus according to claim 19 wherein the means causing the docking base to be raised and lowered vertically comprises means capable of being raised and lowered vertically upwardly and downwardly connected to said docking base, an elongated member having a top end and a bottom end, said elongated member being pivotally connected at its top end to said means capable of being raised vertically upwardly and downwardly, an elongated lever having a first end and a second end, a cam follower being provided on said lever between said first and second ends, the bottom end of said elongated member being pivotally connected to the first end of the lever, a support member for the lever being pivotally connected to the lever at its second end, a frame member being fixedly connected to the lever support member, and a box cam being connected to said frame member and operatively associated with the cam follower provided on the lever whereby to cause the registration din to be raised vertically upwardly and retracted vertically downwardly.

21. Registration apparatus according to claim 20 wherein the elongated member comprises a collapsible linkage.

22. Registration apparatus according to claim 20 further comprising additional means provided in operative association with the docking base for elevating the docking base and further ensuring that the registration pin rises in the desired vertical upright manner to intrude through said centerhole.

23. Registration apparatus according to claim 20 further comprising a vertically disposed member having a top end and a bottom end, said bottom end being fixedly connected to the docking base, an elongated spring member extending from and being fixedly connected at one end to the vertically disposed member at the top end, said spring member terminating at its other end in a forked free end and extending downwardly whereby to be in pressure contact with the top surface of the pin base member and so that the forked free end partially surrounds the bottom end of the elongated circular-shaped registration pin.

24. In apparatus for the printing of a plurality of compact discs one-at-a-time in predetermined timed sequence comprising in combination a horizontally disposed transport member defined by top and bottom planar parallel surfaces for transport of a plurality of compact discs in predetermined spaced-apart locations on said top surface to and through at least one predetermined work stations at least one of which stations comprises a printing head, a horizontally disposed support member in fixed location relative to the transport member for the compact discs being defined by a planar top surface, a portion of the said support member being in and defining a horizontally disposed plane above and parallel to that defined by the transport member for the compact discs; the said at least one printing head being located on and supported by said support member, the improvement comprising in combination a single registration means for registering each compact disc as it is being loaded onto the transport member, said registration means being located below the bottom surface of the transport member and comprising a vertically upright elongated registration pin defined by a top rounded end and a bottom end, a pin base member being defined by a top surface and a bottom surface, said pin bottom end being fixedly connected to the pin base member at said top surface and holding said pin in vertically upright manner, a docking base defined by a top surface and a bottom surface, said pin base member being supported by the top surface of the docking base, and means operatively associated with the bottom surface of the docking base capable of raising the docking base vertically upwardly and then retracting such vertically downwardly a predetermined distance whereby the registration pin is raised vertically upwardly and then retracted downwardly a predetermined distance.

25. In apparatus according to claim 24 wherein the improvement further comprises means for holding the pin base member on the docking base with a predetermined force.

26. In apparatus according to claim 25 wherein the holding means comprises a magnet.

* * * * *